United States Patent
Fredlund et al.

(10) Patent No.: US 7,177,484 B2
(45) Date of Patent: Feb. 13, 2007

(54) METHOD FOR USING CUSTOMER IMAGES IN A PROMOTIONAL PRODUCT

(75) Inventors: John R. Fredlund, Rochester, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 769 days.

(21) Appl. No.: 10/375,848

(22) Filed: Feb. 26, 2003

(65) Prior Publication Data

US 2004/0165218 A1   Aug. 26, 2004

(51) Int. Cl.
  *G06K 9/36*   (2006.01)
  *G06K 5/00*   (2006.01)

(52) U.S. Cl. ...................... 382/284; 345/629

(58) Field of Classification Search ........... 382/284, 382/305, 312; 345/630, 641, 634–637, 629; 705/23, 26
See application file for complete search history.

(56) References Cited

U.S. PATENT DOCUMENTS

| | | | | |
|---|---|---|---|---|
| 5,808,723 A * | 9/1998 | Klees | ................. | 355/40 |
| 5,986,671 A | 11/1999 | Fredlund et al. | ............ | 345/629 |
| 6,075,542 A | 6/2000 | Fredlund et al. | ............ | 715/848 |
| 6,157,435 A | 12/2000 | Slater et al. | ................... | 355/40 |
| 6,344,853 B1 * | 2/2002 | Knight | ....................... | 345/629 |
| 6,414,693 B1 * | 7/2002 | Berger et al. | ............... | 345/641 |
| 6,587,839 B1 * | 7/2003 | McIntyre et al. | ............. | 705/27 |
| 6,837,436 B2 * | 1/2005 | Swartz et al. | ......... | 235/472.02 |
| 7,013,290 B2 * | 3/2006 | Ananian | ..................... | 705/27 |
| 7,040,541 B2 * | 5/2006 | Swartz et al. | ......... | 235/472.02 |
| 2001/0031102 A1 * | 10/2001 | Lunetta et al. | ............. | 382/284 |

OTHER PUBLICATIONS

U.S. Appl. No. 10/061,385, Entitled: System and Method of Processing A Digital Image For User Assessment of an Output Image Product, by Fredlund, et al, filed: Feb. 1, 2002.

* cited by examiner

*Primary Examiner*—Kanjibhai Patel
(74) *Attorney, Agent, or Firm*—Susan L. Parulski; Kathleen Neuner-Mann

(57) ABSTRACT

A method of offering a customized promotional product to a user. The method comprises the steps of: accessing a user-supplied digital image at a digital imaging device; providing a digital image representative of a promotional product, the promotional product digital image having a predetermined image location adapted to receive at least a portion of the user-supplied digital image; generating a modified user image by modifying the at least a portion of the user-supplied digital image to simulate an application of the at least a portion of the user-supplied image to the promotional product; generating a customized digital image representative of the customized promotional product, the customized digital image comprising the promotional product digital image having the modified user image disposed within the predetermined image location; and displaying the customized digital image to the user on a display of the digital imaging device.

14 Claims, 7 Drawing Sheets

METHOD FOR USING CUSTOMER IMAGES IN A PROMOTIONAL PRODUCT

FIELD OF THE INVENTION

The invention relates generally to the field of digital imaging. More specifically, the invention relates to a method of offering and/or ordering a customized imaging-bearing product.

BACKGROUND OF THE INVENTION

Many individuals enjoy the field of photography—from the casual and amateur photographer to the professional—and many attempts are made to capture a pleasing photograph. These photographic images can be captured using conventional photosensitive media, such as 35 mm and APS film, or captured digitally using a digital camera.

Once an image is captured, an imaging service and/or product can be obtained, for example, photofinishing, reprints, enlargements, uploading to a server, transfer to a floppy or CD, image-bearing products, and the like. To obtain these imaging services and/or products, the user typically goes to a food/mass/drug retailer who offers such imaging service and/or products. It is to the financial benefit of the retailer to sell as many imaging services and/or products as possible to the customer/user. Retailers currently display generic pictures or other advertising to entice a user to purchase imaging services and/or products. These pictures/ads may have little or no interest to the user. For example, the pictures may be of a cat, but the user has no interest in pets. In addition, clerks at the retail location are coached to ask the user if they would like to try a new or existing imaging service and/or product. However, many users are unfamiliar with the offered services or are too busy to inquire. Further, many retailers use kiosks, rather than clerks, to take in orders for imaging services and/or products.

The present invention provides a method directed at overcoming the disadvantages mentioned above by employing a kiosk to personalize the imaging service and/or products being offered to the individual user.

SUMMARY OF THE INVENTION

An object of the present invention is to provide a method of offering a customized promotional product to a user.

Another object of the present invention is to provide such a method which is suitable for use with a kiosk.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method of offering a customized promotional product to a user. The method comprises the steps of: accessing a user-supplied digital image at a digital imaging device; providing a digital image representative of a promotional product, the promotional product digital image having a predetermined image location adapted to receive at least a portion of the user-supplied digital image; generating a modified user image by modifying the at least a portion of the user-supplied digital image to simulate an application of the at least a portion of the user-supplied image to the promotional product; generating a customized digital image representative of the customized promotional product, the customized digital image comprising the promotional product digital image having the modified user image disposed within the predetermined image location; and displaying the customized digital image to the user on a display of the digital imaging device.

According to another aspect of the invention, there is provided a method of placing an order for a customized product. The method comprises the steps of: accessing a user-supplied digital image at a digital imaging device; providing a digital image representative of a promotional product, the promotional product digital image having a predetermined image location adapted to receive at least a portion of the user-supplied digital image; generating a modified user image by modifying the at least a portion of the user-supplied digital image to simulate an application of the at least a portion of the user-supplied image to the promotional product; generating a customized digital image representative of the customized product, the customized digital image comprising the promotional product digital image having the modified user image disposed within the predetermined image location; displaying the customized digital image to the user on a display of the digital imaging device; providing a product order menu adapted to place a product order for the customized product; receiving the product order for the customized product; generating the customized product; and delivering the customized product.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
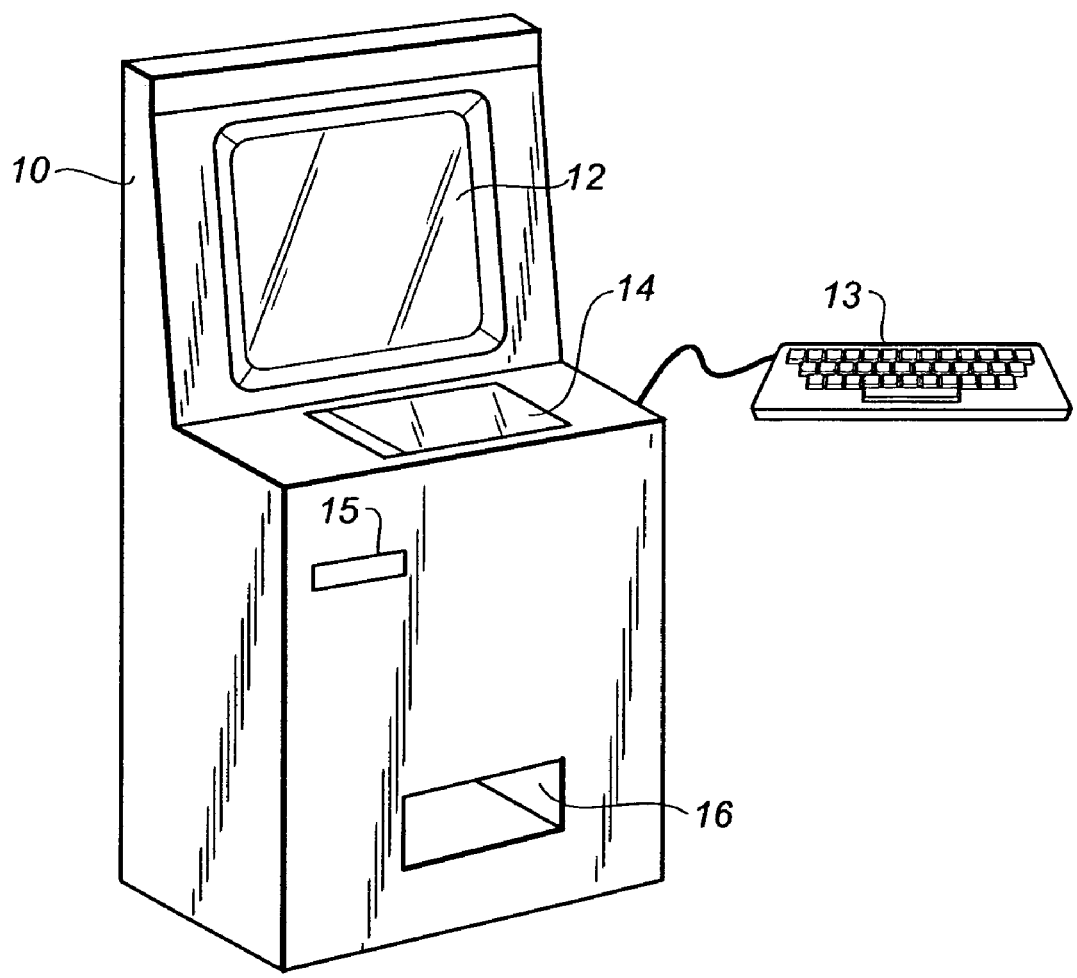
FIG. 1 shows an image producing device in accordance with the present invention.

The following is a detailed description of the preferred embodiments of the invention, reference being made to the drawings in which the same reference numerals identify the same elements of structure in each of the several figures.

The present invention employs an imaging device having an image display and means for accessing and displaying the image on the display. Examples of such imaging devices are image capture devices such as a digital camera, and an automatic picture machine such as a kiosk. An example of a kiosk is a Picture Maker™ kiosk produced by Eastman Kodak Company. Since the imaging device is intended for use at a retail location, the imaging device is preferably configured as a kiosk since it can be easily recognized, its size can provide visibility, and it can have a display of a size for ready viewing by a user. Accordingly, for ease of discussion only, the present invention will be disclosed with regard to a kiosk, though it is understood that other imaging devices known to those skilled in the art can be employed to accomplish the method of the present invention.

An imaging device configured as a kiosk is generally illustrated in FIG. 1. Kiosk 10 includes a color display 12 for presenting information to a user. Color display 12 can be a touchscreen display, whereby a user can provide information and data to kiosk 10, or a keyboard 13 may be used to provide information and data. A scanner 14 may be optionally provided for receiving a user-supplied visual image (e.g., a hardcopy image) and converting the visual image into digital form. Alternatively, an input port 15 may be provided for receiving the user-supplied visual image in digital form, such as from a memory card, memory stick, floppy disk, compact disc, PictureCD, or the like. If kiosk 10 includes a printer or other creation device, a delivery section 16 is provided for controlling the delivery of a medium. Delivery section 16 is illustrated in FIG. 1 as an opening in kiosk 10.

Figure 2:
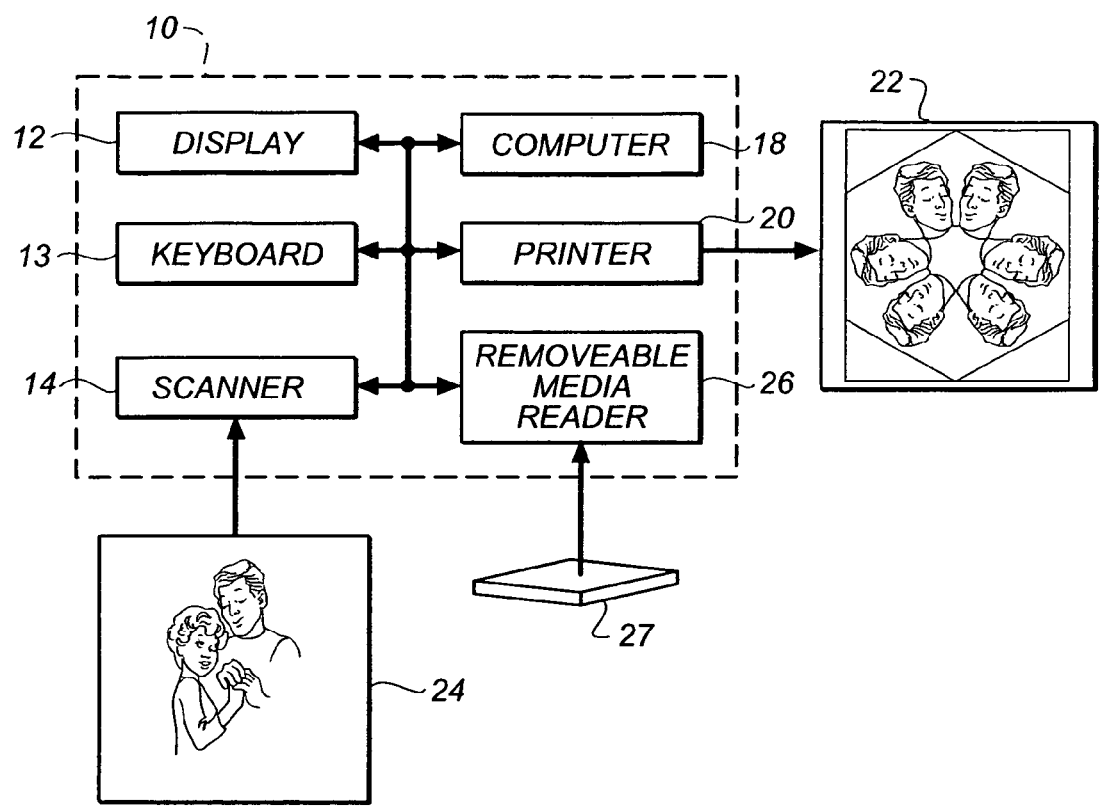
FIG. 2 generally shows a diagram of included functions of the image producing device of FIG. 1.

FIG. 2 generally shows a diagram of included/optional functions of kiosk 10. As illustrated, kiosk 10 includes display 12 and/or keyboard 13 for entering information/data into a computer 18. Computer 18 typically manages the flow of information and functionality of the components of kiosk 10. An optional printer 20 can be internal to kiosk 10, an example of which is the Kodak Digital Science Model 8650 manufactured by Eastman Kodak Company. Printer 20 responds to commands of computer 18 for forming an image on a medium such as thermal or ink-jet paper. An example of an image is illustrated in FIG. 2 at 22 that was formed from a user-supplied visual image 24. As described above, another method of receiving user-supplied visual image 24 is illustrated by a removable media reader 26 for receiving removable media 27, for example, a memory card, floppy disk, compact disc, PictureCD, or other form of removable media used in transferring digital files. Alternatively, as is known to those skilled in the art, kiosk 10 can be in communication with a computer or other server by means of a communication network (not shown) to receive/transmit digital images to/from kiosk 10.

When a user desires an imaging service and/or product, the user takes a personal image and presents the personal image to the kiosk for the imaging service and/or product. Applicant believes that if the user is utilizing the kiosk with a personal image, that personal image most likely has great personal value to the user.

For example, if the user is ordering an enlargement from the user-supplied image, it is likely that the personal image has great personal value to the user. Similarly, editing of the user-supplied image (e.g., zoom, crop, rotate), can also present an indication of the personal value of the user-supplied image to the user. This presents an opportunity to provide the user with an opportunity to purchase further items, such a further enlargements or related items such as a picture frame for the ordered enlargement.

Accordingly, during the time period that the user is using the kiosk, there may be opportunities to upsell the user to more or upgraded products and/or services. For example, during the time the kiosk is processing the user's request for the imaging service and/or product, there may be a duration of time wherein computer 18 is processing the user's request, such as printing, scanning,-editing, or transmitting. This time might provide an opportunity for the kiosk to upsell the user to more or upgraded services.

The present invention personalizes the upsell to interest the user in the imaging service and/or product. That is, Applicant believes that showing the imaging service and/or product using a personal image (i.e., a non-generic image) rather than a generic image product will interest/entice the user to purchase the imaging service and/or product. More particularly, it is believed that generic images have minimal appeal to the user, and the presentation of generic images on products beyond that which the user orders creates minimal excitement, and thus minimal interest in ordering an additional product. Kiosk 10 provides an opportunity for personalizing information to the user since each user presents to the kiosk a user-supplied image with each use of the kiosk.

Accordingly, the method in accordance with the present invention employs a user-supplied image in offering customized products to each user of the kiosk. That is, the image provided by the user is used to generate a promotional display on display 12 that displays additional imaging service and/or products.

A method in accordance with a first embodiment of the present invention is now described with reference FIGS. 3 through 6 for offering a customized promotional product to a user.

Figure 3:
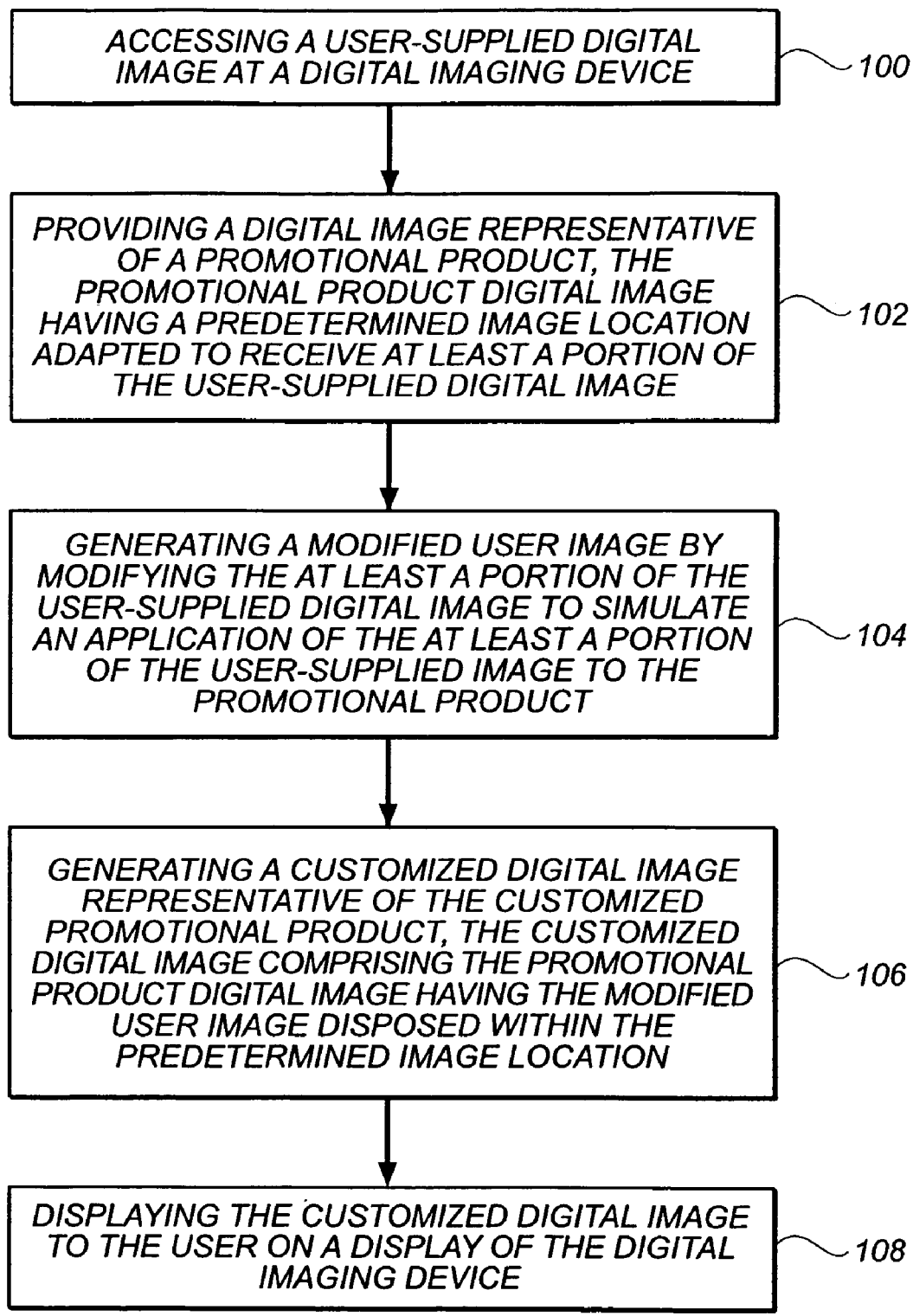
FIG. 3 shows a flow diagram of a method in accordance with a first embodiment of the present invention.

FIG. 3 shows a flow diagram of the method. At step 100, a user-supplied digital image is accessed at kiosk 10. As described above with reference to FIGS. 1 and 2, the digital image can be accessed using removable media 27 and input port 15. Alternatively, optional scanner 14 can be employed to convert a visual image into digital form. For the present example, user-supplied (i.e., input, personal) image is image 24 as shown in FIG. 2.

Figure 4A:
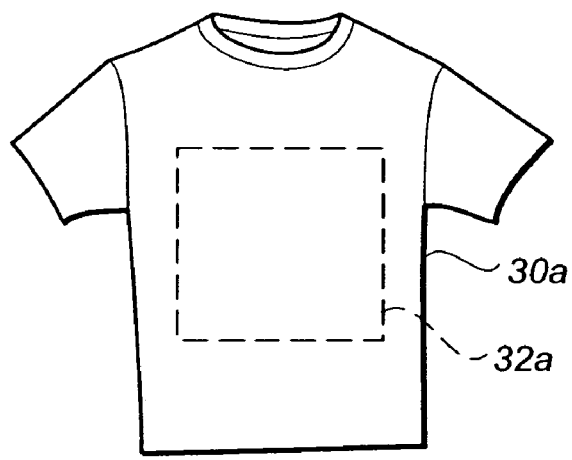
FIGS. 4a–4c show representations of exemplary custom products having predetermined location to receive a user-supplied image.
Figure 4B:
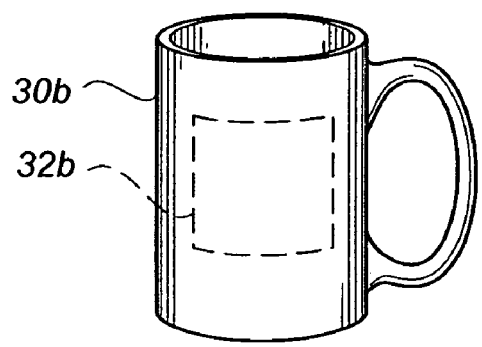
Figure 4C:
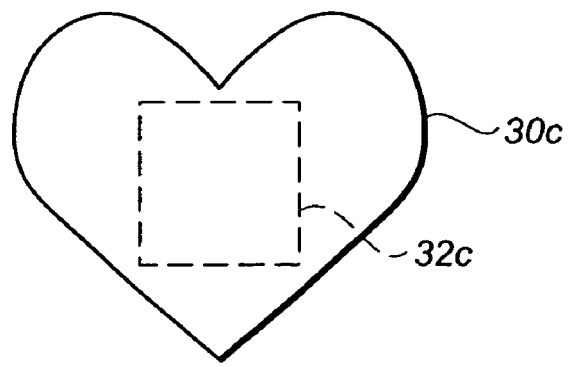

At step 102, a digital image representative of a promotional product is provided, wherein the promotional product digital image includes a predetermined image location adapted to receive at least a portion of the user-supplied digital image. The digital representation can be a pre-stored digital image. FIG. 4a through 4c show examples of representations of promotional products wherein product 30a is a tee-shirt, product 30b is a cup, and product 30c is a heart-shaped image. It is understood that other products can be known to those skilled in the art, including, but not limited to, puzzles, posters, calendars, business cards, personalized checks, and the like. Other products can include special effects, such as the generation of a black/white image from a color image, a sepia print, or cartoon rendering of the user-supplied image. Each product 30a–30c includes predetermined image location 32a, 32b, 32c, respectively, wherein an image can be received.

At step 104, a modified user image is generated by modifying the at least a portion of the user-supplied digital image to simulate an application of the at least a portion of the user-supplied image to the promotional product, as described in commonly-assigned U.S. Ser. No. 10,061,385 titled "SYSTEM AND METHOD OF PROCESSING A DIGITAL IMAGE FOR USER ASSESSMENT OF AN OUTPUT IMAGE PRODUCT" by Fredlund et al, filed Feb. 20, 2003, incorporated herein by reference, and more particularly described below. Simulating the application of the user-supplied image will allow the user to more particularly obtain an accurate representation of the final product which would be purchased. For example, if the user-supplied image is to be applied to a tee-shirt, texturing of the user-supplied image will provide a more accurate representation for the user. Since the products being offered may be three-dimensional, such as a coffee mug, not all of the user-supplied image may be viewed. As such, in some situation, only a portion of the user-supplied image needs to be modified.

The user-supplied digital image can be modified according to the perspective provided by the surface of the 3-dimensional object where the user-supplied digital image is to be applied. For example, if the image is to be applied to a mug having a rounded surface, the image can be modified to provide a perspective representation.

Further, custom image treatments can be applied to the user-supplied image on the customized promotional product. Examples of such an image treatments includes tiling and posterization.

Figure 5A:
FIGS. 5a–5c show exemplary customized products.
Figure 5B:
Figure 5C:
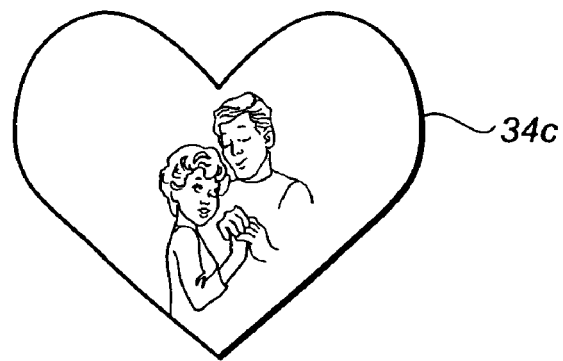

At step 106, a customized digital image is generated representative of the customized promotional product. As such, the customized digital image comprises the promotional product digital image having the modified user image disposed within the predetermined image location. FIGS. 5a through 5c show customized products 34a–34c comprised of, respectively, products 30a–30c and image 24 disposed with predetermined image location 32a–34c, respectively.

Combing a digital image with a pre-stored image is known to those skilled in the art. U.S. Pat. No. 6,075,542 (Fredlund) and U.S. Pat. No. 5,986,671 (Fredlund), both commonly-assigned and incorporated herein by reference, relate to methods of combining a digital image with a pre-stored digital image.

Figure 6:
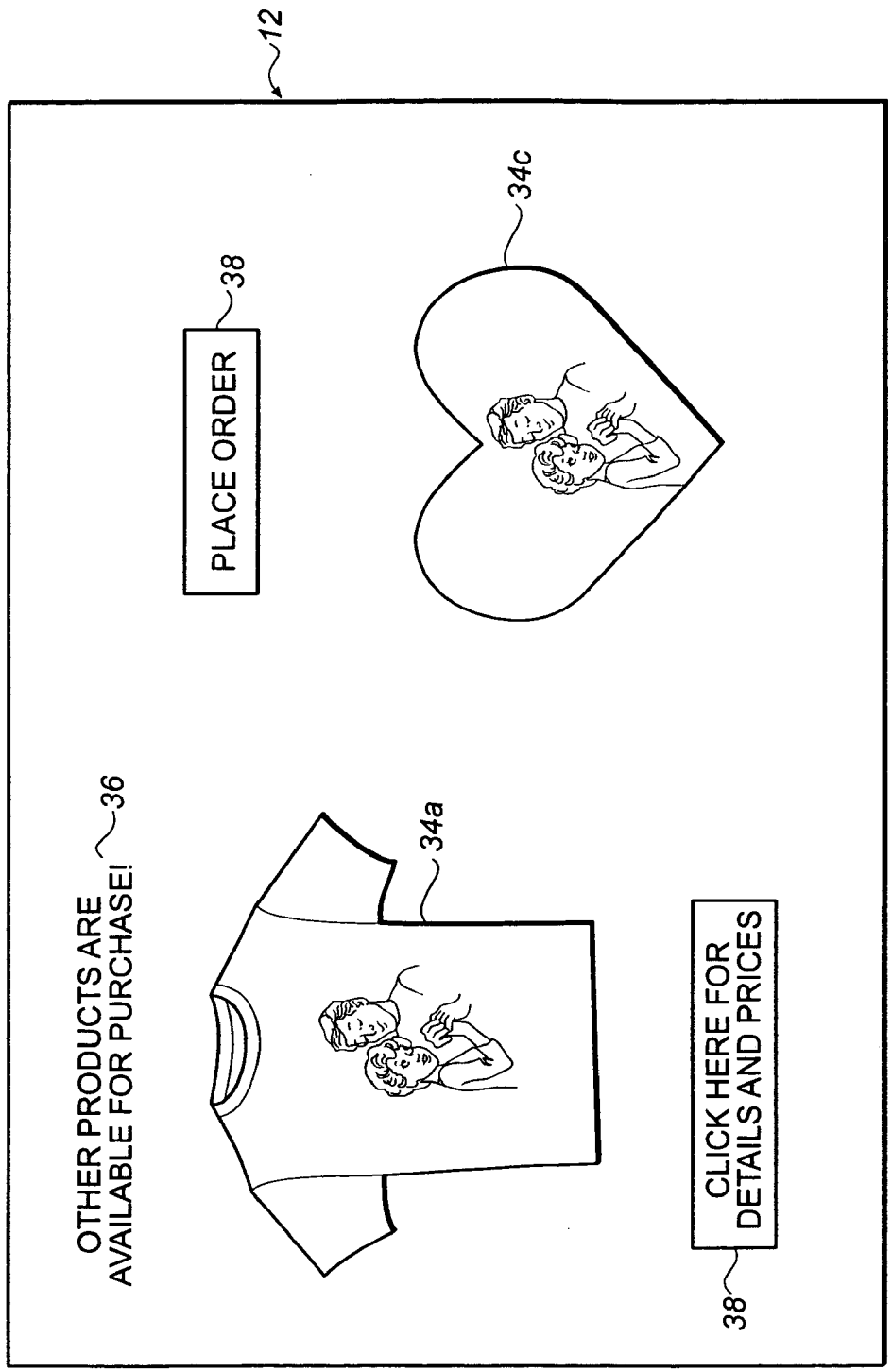
FIG. 6 shows a screen of the display displaying a plurality of customized products.

At step 108, the customized digital image is displayed to the user on a display of the digital imaging device. Referring to FIG. 6, there is shown display 12 displaying two customized promotional products 34a, 34c. An information area 36 can display textual information about the customized product being displayed.

Display 12 can further include a menu 38 for the customized product. The menu can provide further information about the customized product as well as provide for the placing of an order for the customized product. Menu 38 can be positioned proximate the customized product(s), as shown in FIG. 6, or provided on an alternate screen. Menu 38 can include information relating to the product, including but not limited to, cost, time for delivery, warranty, and material information of the product.

Figure 7:
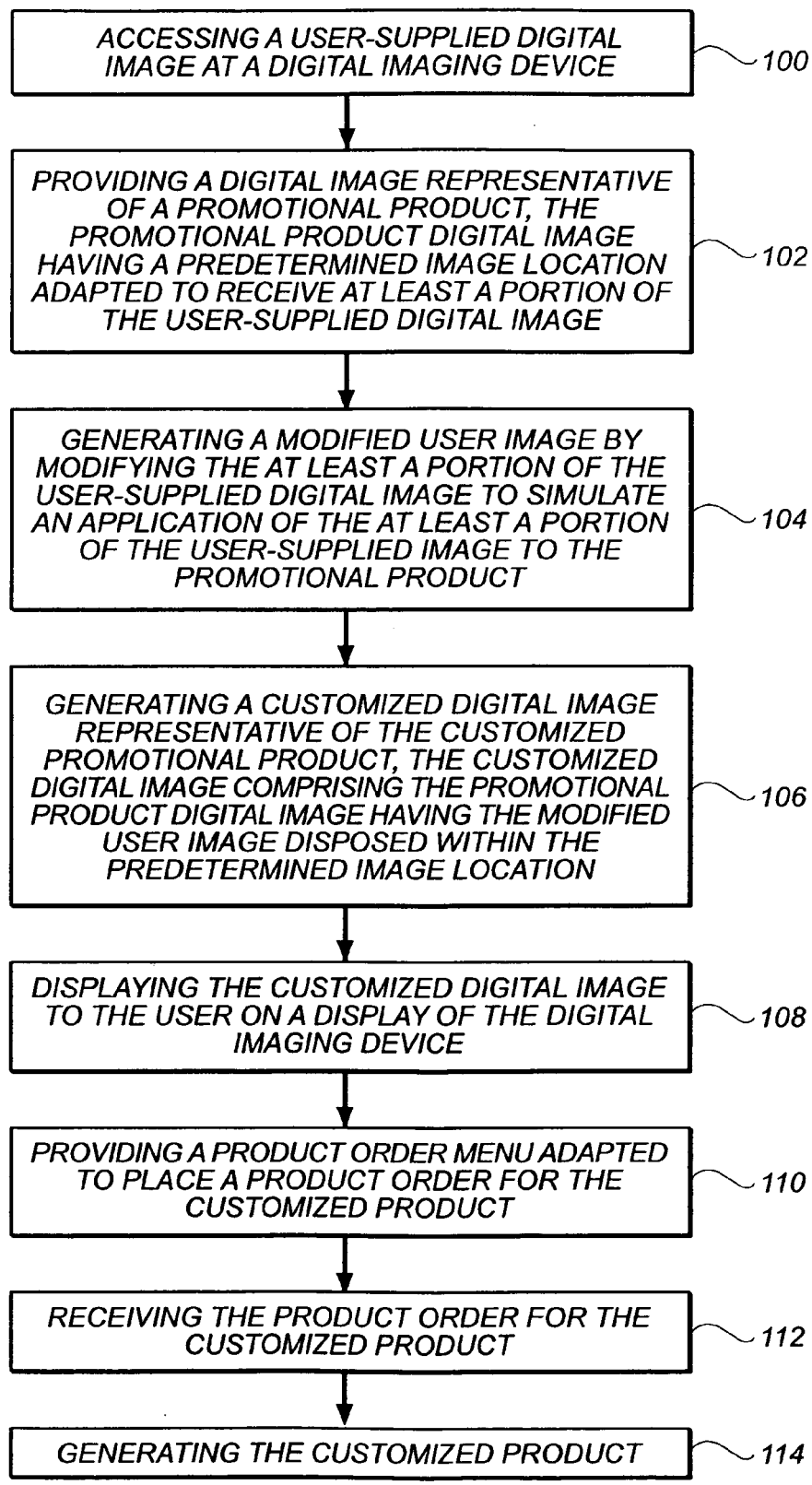
FIG. 7 shows a flow diagram of a method in accordance with a second embodiment of the present invention.

Accordingly, the present invention provides a method of placing an order for a customized product. A diagram for such a method is show in the flow diagram of FIG. 7. Steps 100 through 108 are the same as for the method shown in FIG. 3. At step 110, product order menu 38 is provided wherein menu 38 is adapted to place a product order for the customized product. Then, at step 112, the product order for the customized product is received by a service provider or photo finishing lab authorized to generate the customized product. The order and/or user-supplied digital image can be transmitted over a communication network to the service provider/lab or by physically delivering a removable media to the service provider/lab. Once the customized product is generated (step 114), the customized product is delivered to the user. Delivery can be accomplished by returning the product to the retail location of kiosk 10, by delivery direct to the user by known delivery methods or other known delivery methods. If kiosk 10 is so configured, the customized product could be generated by kiosk 10. For example, if the customized product is a special enlargement employing sepia effects, kiosk 10 can generate the print using printer 20 and deliver the enlargement to the user by means of delivery section 16.

For some promotional products, one view of the product on display 12 may not accurately or completely represent the customized promotional product. For example, the promotional product might be three-dimensional. As such, it may be preferred to provide more than one view of the representation of the customized promotional product. An isometric view might be paired with a front view or a front view might be shown proximate a side view.

It might be desired to show the customized promotional product in use or in a common usage scene/scenario. For example, if the customized promotional product relates to clothing, the representation of the customized personal product might be displayed on display 12 as being worn by an individual. If the customized promotional product is a tee-shirt, the representation might be of a person wearing the tee-shirt. In a further example, the representation of the person wearing the tee-shirt might include a background scene to simulate a more realistic representation. The background scene might be selected to compliment the content/colors of the tee-shirt.

A menu can be provided to allow a user to request particular artistic rendition of the user-supplied image for generation of the customized product. For example, caricature, beautification, and image effects. Variation of a particular artistic rendition can be displayed. Indeed, a plurality of customized digital images can be displayed at step 108, wherein the variations of the renditions can be displayed as a group or as a sequence? For example, the user can request variations, and the variations can be shown as whereby the variations encircle the original. That is, the variations can be shown as a ring-around with the original (i.e., user-supplied) image in the middle. Alternatively, a slide show can be provided with various image effects being displayed (i.e., the user-supplied image adjacent to an effected image).

The content of the user-supplied image can be analyzed to determine which promotional product to display. For example, if a baby is detected in the content, the promotional product represented on display 12 might be related to baby products, such as a customized baby book, a baby frame, a baby card, or a gift certificate for the retail store which has been customized with the user-supplied image. Similarly, if the content is analyzed to include a theme character, such as a cartoon character, products having that particular theme could be presented on display 12. Likewise, textual content (i.e., text within the user-supplied image) can be detected for use in determining what promotional product to display. For example, if there is a "happy birthday" sign in the content of the user-supplied image, a suite of birthday items can be presented, such as a border template which says "happy birthday", customized happy birthday balloons, customized party napkins, and the like. Accordingly, when the content of the user-supplied image would be analyzed whereby the detected content would be categorized to determine a category. Once the category is determined, the promotional product can be selected from a plurality of promotional products within the category.

Object recognition software is available to analyze the content of the digital image. Other software and/or algorithms may be known to those skilled in the art for analyzing the content of a digital image. U.S. Pat. No. 6,157,435 (Slater), commonly-assigned and incorporated herein by reference, relates to content recognition and image recognition.

Alternatively, if a user profile is available, products which are associated with the user profile can be selected for display. That is, if a loyalty card or other retailer card was available that collects information about the purchases of the user at the retail location, such collected information can be used to determine which promotional products to display to the user.

Non-customized promotional products might also be displayed in association with the customized promotional product. For example, specials on photo albums, frames, and the like.

As indicated above, at step 104, a modified user image is generated by modifying the at least a portion of the user-supplied digital image to simulate an application of the at least a portion of the user-supplied image to the promotional product, as described in commonly-assigned U.S. Ser. No. 10,061,385 titled "SYSTEM AND METHOD OF PROCESSING A DIGITAL IMAGE FOR USER ASSESSMENT OF AN OUTPUT IMAGE PRODUCT" by Fredlund et al, filed Feb. 20, 2003. One means for creating the substantially accurate representation is to display pixels of the user-supplied digital image at the resolution of display 12. For example, if the digital image has a resolution of 1000×1000, and the resolution of display 12 is 100×100, then display 12 will show 1/100 of the pixels of the full digital image. The term "substantially" indicates that there may be a variance, possibly up to 10 percent of the digital image, between the digital image and the representation displayed in display 12.

There are various limiting factors in modifying the user-supplied digital image to simulate application of the image to the promotional product: (1) the input is resolution limited, (2) the output is resolution limited, (3) the display screen is resolution limited, and (4) the output image product (i.e., the display of the customized promotional product) may cause a distortion.

An example of limited input resolution is the enlargement of a photograph from a wallet size photo to a 20×30 inch size.

An example of limited output resolution is the transfer of an image to a tee shirt. For example, if an 8×10 photo is scanned at a kiosk and the user selects a tee shirt product, display 12 is resolution limited due to the low resolution of the tee shirt transfer process.

An example of the display screen being limited is a low resolution monitor.

An example of the output image product causing distortion is the creation of a mug. For example, if a 4×6 photo is scanned at a kiosk and the user selects a mug product, a portion of the scanned image is manipulated such that a representation of a portion of the mug product is displayed on display 12. The viewing member shows the resulting product as it will appear on the mug, which is resolution limited due to the low resolution of the mug transfer process. Additionally, the representation will show the image distorted as it will be by the cylindrical shape of the mug. Furthermore the dynamic range of the scanned image will be decreased due to the limited dynamic range of the mug transfer process.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 kiosk
12 color display
13 keyboard
14 scanner
15 input port
16 delivery section
18 computer
20 optional printer
22 example image
24 visual image
26 removable media reader
27 removable media
30$a$–30$c$ products
32$a$–32$c$ predetermined image location
34$a$–34$c$ customized products
36 information area
38 menu

What is claimed is:

1. A method of offering a customized promotional product to a user, the method comprising the steps of:
    accessing a user-supplied digital image at a digital imaging device;
    providing a digital image representative of a promotional product, the promotional product digital image having a predetermined image location adapted to receive at least a portion of the user-supplied digital image;
    generating a modified user image by modifying the at least a portion of the user-supplied digital image to simulate an application of the at least a portion of the user-supplied image to the promotional product;
    generating a customized digital image representative of the customized promotional product, the customized digital image comprising the promotional product digital image having the modified user image disposed within the predetermined image location; and
    displaying the customized digital image to the user on a display of the digital imaging device.

2. The method of claim 1, wherein a plurality of customized digital images are displayed, each representative of a different customized promotional product.

3. The method of claim 1, further comprising a step of providing an order menu proximate the customized digital image for placing a product order for the customized promotional product.

4. The method of claim 1, further comprising the steps of:
    detecting a content of the user-supplied image;
    categorizing the detected content to determine a category; and
    selecting the promotional product from a plurality of promotional products within the category.

5. The method of claim 1, wherein the digital imaging device comprises a computer for processing a request for an imaging service and/or product, and the step of displaying the customized digital image is accomplished when the computer is processing the request.

6. The method of claim 1, further comprising the steps of:
    generating a plurality of views of the customized digital image representative of the customized promotional product; and displaying the plurality of views of the customized digital image to the user on the display of the digital imaging device.

7. The method of claim 1, further comprising the step of displaying the customized digital image to the user on a display of the digital imaging device in a scene.

8. A method of placing an order for a customized product, the method comprising the steps of:
- accessing a user-supplied digital image at a digital imaging device;
- providing a digital image representative of a promotional product, the promotional product digital image having a predetermined image location adapted to receive at least a portion of the user-supplied digital image;
- generating a modified user image by modifying the at least a portion of the user-supplied digital image to simulate an application of the at least a portion of the user-supplied image to the promotional product;
- generating a customized digital image representative of the customized product, the customized digital image comprising the promotional product digital image having the modified user image disposed within the predetermined image location;
- displaying the customized digital image to the user on a display of the digital imaging device;
- providing a product order menu adapted to place a product order for the customized product;
- receiving the product order for the customized product;
- generating the customized product; and
- delivering the customized product.

9. The method of claim 8, wherein a plurality of customized digital images are displayed, each representative of a different customized promotional product.

10. The method of claim 8, further comprising a step of providing an order menu proximate the customized digital image for placing a product order for the customized promotional product.

11. The method of claim 8, further comprising the steps of:
- detecting a content of the user-supplied image;
- categorizing the detected content to determine a category; and
- selecting the promotional product from a plurality of promotional products within the category.

12. The method of claim 8, wherein the digital imaging device comprises a computer for processing a request for an imaging service and/or product, and the step of displaying the customized digital image is accomplished when the computer is processing the request.

13. The method of claim 8, further comprising the steps of:
- generating a plurality of views of the customized digital image representative of the customized promotional product; and
- displaying the plurality of views of the customized digital image to the user on the display of the digital imaging device.

14. The method of claim 8, further comprising the step of displaying the customized digital image to the user on a display of the digital imaging device in a scene.

* * * * *